(12) United States Patent
Adamczak et al.

(10) Patent No.: US 11,965,566 B2
(45) Date of Patent: Apr. 23, 2024

(54) SYSTEM FOR VACUUMING BRAKING PARTICLES WITHOUT LOSS OF VACUUM

(71) Applicant: TALLANO TECHNOLOGIE, Boulogne Billancourt (FR)

(72) Inventors: Loïc Adamczak, Boulogne Billancourt (FR); Thibaut Le Boulaire, Boulogne Billancourt (FR); Matthieu Hascoet, Boulogne Billancourt (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 435 days.

(21) Appl. No.: 17/291,560

(22) PCT Filed: Oct. 30, 2019

(86) PCT No.: PCT/FR2019/052581
§ 371 (c)(1),
(2) Date: May 5, 2021

(87) PCT Pub. No.: WO2020/094950
PCT Pub. Date: May 14, 2020

(65) Prior Publication Data
US 2022/0018407 A1     Jan. 20, 2022

(30) Foreign Application Priority Data
Nov. 8, 2018 (FR) ...................... 18 60309

(51) Int. Cl.
*F16D 65/00* (2006.01)
*F16D 129/02* (2012.01)
*F16D 129/10* (2012.01)

(52) U.S. Cl.
CPC ...... *F16D 65/0031* (2013.01); *F16D 2129/02* (2013.01); *F16D 2129/10* (2013.01)

(58) Field of Classification Search
CPC .................... F16D 65/0031; F16D 2129/10
See application file for complete search history.

(56) References Cited

U.S. PATENT DOCUMENTS

2015/0001013 A1*  1/2015  Mennie ............... B60T 5/00
                                            188/73.1
2015/0122601 A1*  5/2015  Rocca-Serra ....... F16D 55/225
                                            188/218 A (Continued)

FOREIGN PATENT DOCUMENTS

CN    205951955    2/2017
DE    42 40 873    6/1994

(Continued)

OTHER PUBLICATIONS

International Search Report for PCT/FR2019/052581 dated Jan. 31, 2020, 7 pages.

(Continued)

*Primary Examiner* — Vishal R Sahni
(74) *Attorney, Agent, or Firm* — NIXON & VANDERHYE

(57) ABSTRACT

System for suctioning braking particles from a friction braking system, the suction system including a negative-pressure source, a suction mouth, a pneumatic circuit connecting the suction mouth and the negative-pressure source, and a control unit, the suction system further including a closure unit arranged on the pneumatic circuit, the closure unit being able to isolate at least a first portion of the pneumatic circuit, the control unit being configured to control the closure means according to a predetermined logic in order to isolate the first portion of the pneumatic circuit during certain phases between two actual uses of the negative-pressure source.

17 Claims, 3 Drawing Sheets

(56) References Cited

U.S. PATENT DOCUMENTS

2017/0248180 A1      8/2017  Metayer
2020/0355230 A1*    11/2020  Arnault .............. B01D 46/2414
2022/0018407 A1*     1/2022  Adamczak ............ B60T 17/02

FOREIGN PATENT DOCUMENTS

| | | |
|---|---|---|
| DE | 295 06 916 | 6/1995 |
| DE | 20 2006 016 661 | 3/2008 |
| DE | 10 2010 024 944 | 12/2011 |
| EP | 1 256 739 | 11/2002 |
| EP | 3 369 959 | 9/2018 |
| FR | 3 036 351 | 11/2016 |
| FR | 3 057 040 | 4/2018 |
| GB | 2497426 | 6/2013 |
| JP | 2012081931 A * | 4/2012 |
| KR | 1998-0061265 A | 10/1998 |
| KR | 100267658 B1 * | 10/2000 |
| WO | 2013/083955 A1 | 6/2013 |

OTHER PUBLICATIONS

Written Opinion of the ISA for PCT/FR2019/052581 dated Jan. 31, 2020, 5 pages.
Office Action issued in Chinese Patent Application No. 201980071962.7 dated Aug. 24, 2022.
Office Action issued in Russian Patent Application No. 2021115099 dated Jul. 6, 2022.

* cited by examiner

SYSTEM FOR VACUUMING BRAKING PARTICLES WITHOUT LOSS OF VACUUM

CROSS-REFERENCE TO RELATED APPLICATIONS

This application is the U.S. national phase of International Application No. PCT/FR2019/052581 filed Oct. 30, 2019 which designated the U.S. and claims priority to FR 18 60309 filed Nov. 8, 2018, the entire contents of each of which are hereby incorporated by reference.

TECHNICAL FIELD

The invention relates to systems for suctioning braking particles in friction braking systems. Such friction braking systems can be fitted to road or rail vehicles. Such friction braking systems can also be fitted to stationary rotor machines such as wind turbines or industrial machines.

BACKGROUND AND PRIOR ART

In such systems, as described for example in document DE4240873, a suction turbine and a particle collection filter are provided. The particles from abrasion are thus gradually accumulated in the collection filter.

The reasonable conventional solution is to activate the suction turbine only when friction braking is actually activated, by the driver or by a system of the vehicle or even generally the control system of the machine.

However, the inventors have noticed that the time required to establish the desired negative pressure in the conduit and suction mouth is not negligible and that, as a result, at the very beginning of the braking phase the negative pressure could still be insufficient for capturing the braking particles correctly.

In other words, if the negative-pressure source (the turbine or other equivalent means) is activated at the moment friction braking begins, the negative pressure can sometimes take too long to establish and the capture rate is not optimal. Furthermore, continuous controlling of the turbine is not desirable either, considering the electrical consumption of the turbine motor and the noise generated by the operation of the turbine.

The object of the present invention is to propose an improved solution relating to capture performance at the very beginning of the friction braking phase.

SUMMARY OF THE INVENTION

To this end, a system for suctioning braking particles from a friction braking system is proposed, the suction system comprising:
  at least one negative-pressure source, at least one suction mouth connected by a pneumatic circuit to the negative-pressure source, and a control unit,
  characterized in that the suction system further comprises closure means arranged on the pneumatic circuit, the closure means being able to isolate at least a first portion of the pneumatic circuit, the control unit being configured to control the closure means according to a predetermined logic in order to isolate the first portion of the pneumatic circuit during certain phases between two actual uses of the negative-pressure source.

The term "closure means" is to be understood to mean any suitable means for interrupting the possibility of air traveling in the circuit at a location of interest, namely a pneumatic valve, a mechanical valve, an electromagnetic valve, or a servo valve.

The term "isolate at least a first portion of the pneumatic circuit" is to be understood to mean isolating this first portion of the pneumatic circuit from the external atmospheric pressure, both on the suction mouth side and on the filter side (or even the negative-pressure source side).

As for the term "pneumatic circuit which connects the suction mouth to the negative-pressure source", this is to be understood to mean a fluid conduit which leads from the suction mouth to the turbine, either directly or through a filter. A first conduit is located downstream of the suction mouth in the particles' path, which leads from the suction mouth to the filter; the turbine may be arranged downstream of the filter or vice versa. The first conduit is wholly or partly under negative pressure, without excluding a portion downstream of the turbine from being under positive pressure (filter downstream of the turbine).

By virtue of the arrangements stated above, it is possible to maintain a negative pressure in the first portion of the pneumatic circuit during an interval of time between two actual activations of the negative-pressure source. This advantageously allows not waiting during the time required to reactivate the negative-pressure source at the very start of a new friction braking phase. In fact, the negative pressure prevailing in the first portion of the pneumatic circuit is placed in communication with the suction mouth without waiting for complete activation of the negative-pressure source.

In various embodiments of the invention relating to the system, use may possibly further be made of one or more of the following arrangements, individually or in combination.

According to one option, the system may comprise at least one filter to collect the suctioned particles.

According to a preferred option, the closure means comprise at least a first valve (51) arranged in the vicinity of the suction mouth and at least a second valve (52) arranged in the vicinity of the negative-pressure source. In this manner, the major portion of the pneumatic circuit connecting the suction mouth to the filter is isolated, this portion being able to have a certain length, the maintaining of negative pressure within its interior space being all the more advantageous since the turbine as a negative-pressure source requires time to start up and reach its target speed of rotation.

According to one option, the pneumatic circuit (3,30) in question includes a particle collection filter.

According to an alternative option, the first portion of the pneumatic circuit which is subject to selective isolation does not include the particle collection filter.

According to one option, the second valve could be arranged in the vicinity of the filter (instead of in the vicinity of the negative-pressure source).

According to one option, several suction mouths are provided for the at least one filter, the system further comprising additional valves (53-55), such that a valve is provided in the vicinity of each suction mouth. In this manner, there is a filter and turbine which are centralized, connected to several suction mouths. In this manner, the cost of the complete solution is optimized. In addition, this reinforces the advantage of maintaining the negative pressure in the pneumatic circuit, especially in a centralized system, as the length of the pipes can be great as well as the volume of air trapped inside.

According to one option, said first valve (51) and said second valve (52) are solenoid valves, and preferably the additional valves are additional solenoid valves (53-55). A very flexible and rapid solution is thus obtained which allows electrically controlling the opening or closing of the closure means.

According to one option, the control unit (6) is configured to control individually each of the first and second solenoid valves, and where appropriate to control individually the additional solenoid valves. In this manner, it is possible to stagger the timing for controlling the first solenoid valve and controlling the second solenoid valve as will be seen below, or more generally to have any temporal sequence depending on the number and configuration of the solenoid valves.

According to one option, the negative-pressure source is formed by a turbine (10) driven by an electric motor (11). This forms a solution independent of any other pneumatic system of the vehicle; in addition, this solution benefits from great control flexibility, as it is possible in particular to control the turbine to be on or off or at any speed of rotation.

According to an alternative option, the negative-pressure source is formed by a negative-pressure source preexisting in the vehicle, in particular, for the case of the automotive sector, a negative-pressure source induced by the operation of the vehicle's engine, for example a bypass from the air intake, or else for example by the use of a Venturi effect on an outgoing stream of gas, for example exhaust gases. In the case of the railway sector, the negative-pressure source may be derived from the pneumatic braking system or from some other auxiliary system of the railway vehicle.

According to one option, the control unit (6) is further configured to control the negative-pressure source selectively, in a manner coordinated with the controlling of the solenoid valves. It is thus possible to have a precise and repeatable sequencing concerning the control of the negative-pressure source (for example the turbine), and the control of the solenoid valves which enable closing the pneumatic circuit in order to maintain a negative pressure therein between two braking sequences.

According to one option, the predetermined negative-pressure setpoint during the suction phase is selected within a range of 20 to 40 millibars below ambient pressure. Advantageously, this is an optimal range for efficiently capturing the braking particles while maintaining a reasonable and inexpensive sizing and moderate dimensions for the elements of the system.

Advantageously, by clever sequencing of the controlling of the solenoid valves, it is possible to maintain a negative-pressure level (DPR2) between two actual braking phases that is at least equal to the setpoint.

The invention also relates to a method for controlling a system for suctioning friction braking particles from a braking system of a vehicle, the suction system comprising at least one negative-pressure source (a turbine or the like), at least one suction mouth, at least one pneumatic circuit (3,30) connecting the suction mouth and the negative-pressure source, closure means arranged on the pneumatic circuit in order to isolate selectively at least a first portion of the pneumatic circuit with a first valve arranged in the vicinity of the suction mouth and at least a second valve, and a control unit configured to implement the steps of:

a1—closing the first valve (51)
a2—closing the second valve (52),
  so as to isolate the first portion of the pneumatic circuit until the next actual use of the negative-pressure source,
b—stopping the activation of the negative-pressure source (turbine or other),
z—waiting for a new occurrence of the need to activate the negative-pressure source,
c0—activating the negative-pressure source (turbine or other),
c1—opening the first valve (51)
c2—opening the second valve (52).

With these arrangements, it is possible to maintain a negative pressure in the first portion of the pneumatic circuit during an interval of time between two actual activations of the negative-pressure source. This advantageously allows not waiting during the time required to reactivate the negative-pressure source at the very start of a new friction braking phase. In fact, the negative pressure prevailing in the first portion of the pneumatic circuit is placed in communication with the suction mouth without waiting for complete activation of the negative-pressure source.

In various embodiments of the invention relating to the method, use may further possibly be made of one or more of the following arrangements, individually or in combination.

According to one option, the opening of the first valve precedes the opening of the second valve, in other words steps c1—and c2—are carried out in chronological order, during activation of the negative-pressure source. Given that the end located on the suction mouth side is opened first, the negative pressure present in the pneumatic circuit at that location tends to suction the particles even if the second solenoid valve and the turbine are not yet energized.

According to one option, said first valve (51) and said second valve (52) are solenoid valves and their opening and closing is controlled by the control unit (6), preferably with individual control so as to be able to carry out steps c1—and c2—with a timing staggered according to the abovementioned established chronological order. It is thus possible to provide staggering timing that is programmable or resulting from a parameter calibration. Fine-tuning of the system and its adaptability are thus facilitated.

According to one option, the closing of the first valve precedes the closing of the second valve, in other words steps a1—and a2—are carried out in chronological order, before or during deactivation of the negative-pressure source. In this manner, it is possible to obtain an increase in the negative pressure just before closing the second solenoid valve. This is beneficial for causing efficient suction the next time the first solenoid valve is reopened.

DESCRIPTION OF FIGURES

Other features, aims and advantages of the invention will be apparent from reading the following description of an embodiment of the invention, given as a non-limiting example. The invention will also be better understood with reference to the accompanying drawings, in which.

DETAILED DESCRIPTION

In the various figures, the same references designate identical or similar elements. For clarity in the presentation, certain elements are not necessarily represented to scale.

Figure 1:
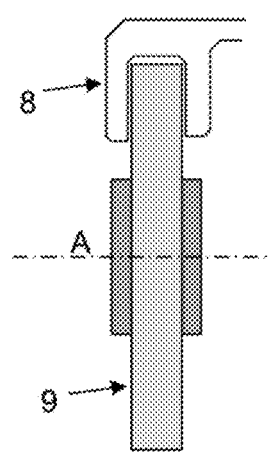
FIG. 1 shows a side view of an example of a friction braking member.

FIG. 1 schematically represents a friction braking member. In the case illustrated, represented is a brake disc 9 intended to be made integral in rotation with a wheel (or an axle for rolling stock). The disc 9 rotates about the axis A. According to the prior art, there is a caliper 7 straddling the disc and mounted on a caliper bracket. In addition, the caliper comprises a piston configured to act on friction pads to sandwich the disc. The friction pads (not shown) are mounted on back plates or sole plates, all of this being known per se and not described in detail here.

Although a diagram of a disc brake has been represented, the invention is also suitable for drum brakes, or even systems with brake pads applied directly to the wheel rim.

At the location of the friction pads, a device 8 for capturing escaping particles is provided. More particularly, a suction mouth 83 may be provided for each of the friction pads. An example can be found for example in document FR3057040 of the present Applicant, where the particles are captured in grooves formed in the friction material. The suction mouth may be formed by the groove(s) which in turn are connected to a through-hole in the sole plate of the friction lining and in communication with a downstream passage (towards the filter).

The suction mouth 83 is connected to a negative-pressure source by a pneumatic circuit. The pneumatic circuit may comprise a first conduit 3 and a second conduit 30.

In general, the suction mouth may be in the path of the particles as they exit the interface between the pad and the rotating member (disc, drum, rim, etc.). It is the negative pressure or the flow created at this location that contributes to a good capture.

In other configurations, a cowling may be provided, in which case the suction mouth is formed by the outlet from the space covered by said cowling.

It should therefore be understood that the invention can be applied regardless of the configuration of the suction mouth 83.

Typically for a disc brake configuration, there will be a suction mouth 83 on each side of the disc, as shown in FIG. 1.

Figure 2:
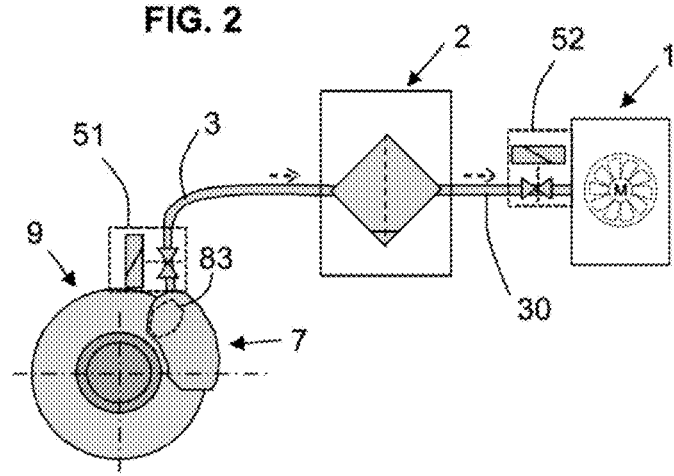
FIG. 2 shows a functional diagram of a localized system for suctioning braking particles, for a wheel or an axle.
Figure 3:
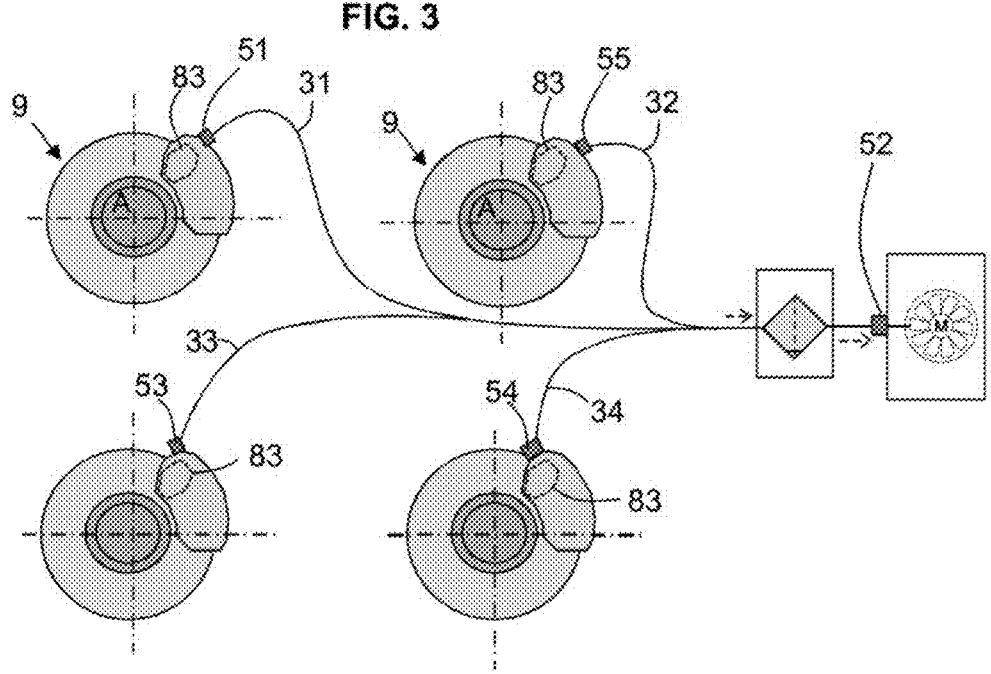
FIG. 3 shows a functional diagram of a centralized system for suctioning braking particles, on several wheels or axles.

The suction mouth (or suction mouths as the case may be) is connected to a filter 2 by a conduit of the pneumatic circuit 3, as exemplified in FIG. 2. The pneumatic circuit 3 may be formed as piping, without excluding a passage in the form of a tunnel through a part (for example the body of the caliper). The pneumatic circuit may be of greater or lesser length; this length may range from a few tens of centimeters, for example 50 cm, to several meters in a centralized filtering configuration as illustrated in FIG. 3.

It is provided to call upon a negative-pressure source.

In general, the fluid connection formed by the pneumatic circuit between the suction mouth and the negative-pressure source (with or without the interposed filter) may comprise one or more branches, T connections, Y connections, etc.

The fluid connection between the suction mouth and the filter 2 may comprise rigid portions and flexible hose portions.

Various configurations can be found between the suction mouths, the filter, and the negative-pressure source: there can be one filter for each suction mouth (maximally decentralized configuration) or even for each pair of suction mouths (FIG. 2), but it is also possible to have a single filter for a plurality of pairs of suction mouths (FIG. 3) (so-called centralized configuration), or even a single filter for the entire vehicle. This choice may be dictated by the type of vehicle, the service life required for the filter before clogging, the various constraints on installation within the vehicle, etc.

Advantageously according to the invention, closure means are provided to be able to selectively isolate at least part of the pneumatic circuit.

According to the example illustrated here in FIG. 2, the closure means comprise a first valve 51 and a second valve 52 that is arranged downstream of the first on the pneumatic circuit.

The first valve 51 is arranged in the vicinity of the suction mouth 83. In one example, the first valve 51 is common to two suction mouths, for example one on each side of a disc, and isolates the two suction mouths 83.

The second valve 52 is arranged in the vicinity of the negative-pressure source 1.

Advantageously, the valves in question are full on/full off valves and are of the type that is open in the rest state (normally open). In other words, in the absence of excitation, the valves do not stop the passage of air in the pneumatic circuit.

Figure 9:
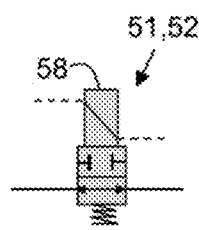

According to a typical example, the valves in question are solenoid valves and can be controlled by electrical excitation. Preferably they are full on/full off solenoid valves. Preferably, they are normally open solenoid valves. Thus, in the event of an electrical or control circuit failure, the solenoid valve remains open and the suction function is preserved. FIG. 9 schematically illustrates such a normally open solenoid valve. The control coil 58 is controlled by a control unit 6 which will be discussed later.

Solenoid valves that are small in size, in other words miniature solenoid valves, will preferably be chosen.

According to one exemplary embodiment, the first solenoid valve 51 is integrated into the assembly of the caliper and/or of the caliper bracket.

According to one exemplary embodiment, the second solenoid valve 52 can be integrated into the negative-pressure source. Other positions for the solenoid valves are not excluded.

Figure 6:
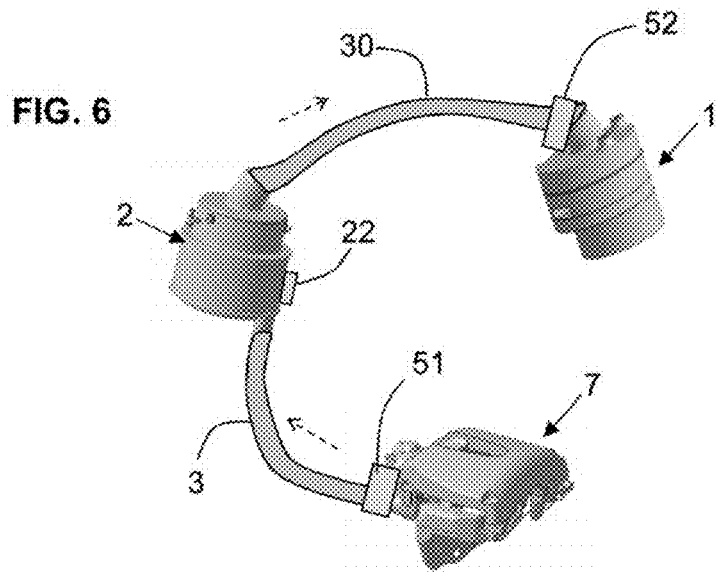
Figure 7:
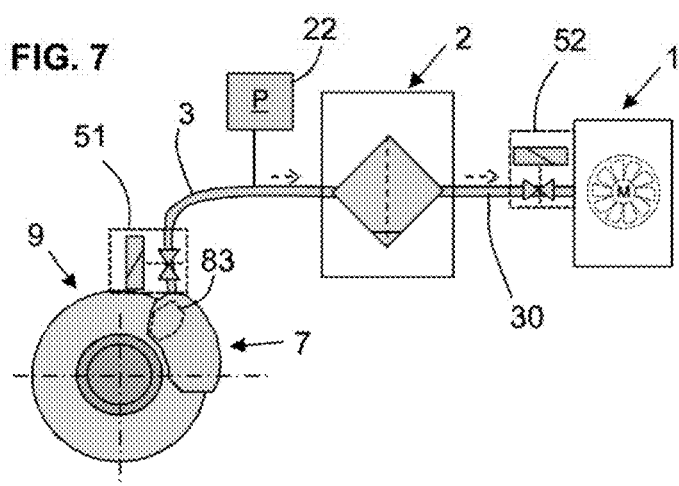
FIG. 7 shows a variant functional diagram of a suction system.
Figure 8:
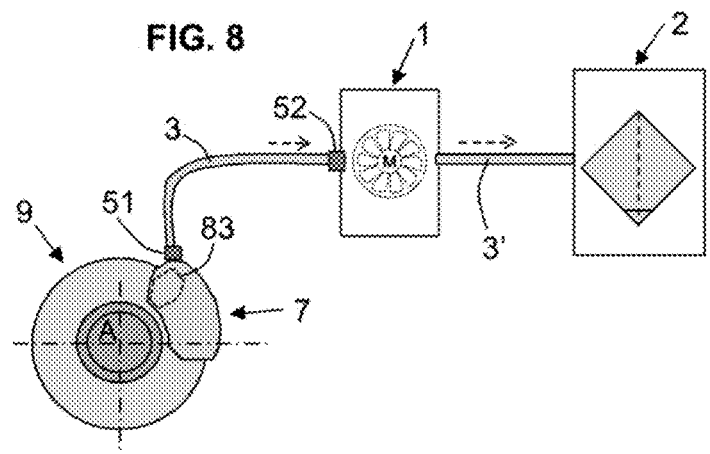
FIG. 8 shows a variant functional diagram of a suction system, FIG. 9 schematically illustrates a solenoid valve.

In FIGS. 2 and 6, a negative-pressure configuration is shown with the filter interposed between the first conduit 3 and the negative-pressure source 1 which suctions the particles through the filter which is then at a negative pressure relative to the external ambient pressure. However, in a configuration shown in FIG. 8, the negative-pressure source (here the turbine 1) may be interposed between the first conduit 3 and the filter, in which case the turbine sucks the particles in and then the turbine blows them into the filter via a downstream conduit denoted 3'. In this case, the filter 2 is at positive pressure instead of negative pressure.

In a typical embodiment, the filter 2 may comprise a filter medium, of paper or some other type, allowing air to pass through and trapping the small particles contained in the stream coming from the suction mouths.

The term 'filter' is to be understood broadly here: this term comprises centrifugal filter solutions ('cyclone' type), filter solutions with an electromagnetic trapping technique, and filter solutions with an electrostatic trapping technique. The term 'filter' also includes a solution where the particles are directed towards an already existing filter such as the passenger compartment air filter or towards the filter of the catalytic converter.

The particle filter 2 is configured to filter air coming from the suction mouths which is carrying solid particles having micrometric or millimeter dimensions, in other words allowing air pass through the filter medium while the particles do not pass through the filter medium and are trapped thereon.

In the example illustrated, the negative-pressure source 1 is formed by a suction turbine 10 driven by an electric motor 11.

In the example illustrated, the turbine with its electric motor forms a separate entity from the filter. Under these conditions, a second pneumatic fluid conduit 30 is provided to connect the turbine to the filter.

It should be noted that a configuration with the turbine and filter as a single entity is also possible.

One will note that according to the example illustrated in FIG. 2, the portion of the pneumatic circuit which is subjected to selective isolation includes the first conduit 3, the second conduit 30, and the collection filter 2.

The inside volume of the filter thus forms part of the zone which will remain at negative pressure between two activations of the braking system with excitation of the negative-pressure source.

FIG. 3 illustrates a centralized configuration in which several suction mouths are served by a single filter and turbine arrangement. Under these conditions, a first pipe 31 serves a braking system with the first solenoid valve already mentioned, near the suction mouth, a second pipe 32 serves a wheel braking system with an auxiliary solenoid valve denoted 55, a third pipe 33 serves a wheel braking system with an auxiliary solenoid valve denoted 53, and a fourth pipe 34 serves a wheel braking system with an auxiliary solenoid valve denoted 54. One will note here that the length of the pipes may be substantial.

The auxiliary (additional) solenoid valves 53-55 will typically be of the same type as the first and second solenoid valves, namely full on/full off solenoid valves of the "normally open" type.

Figure 4:
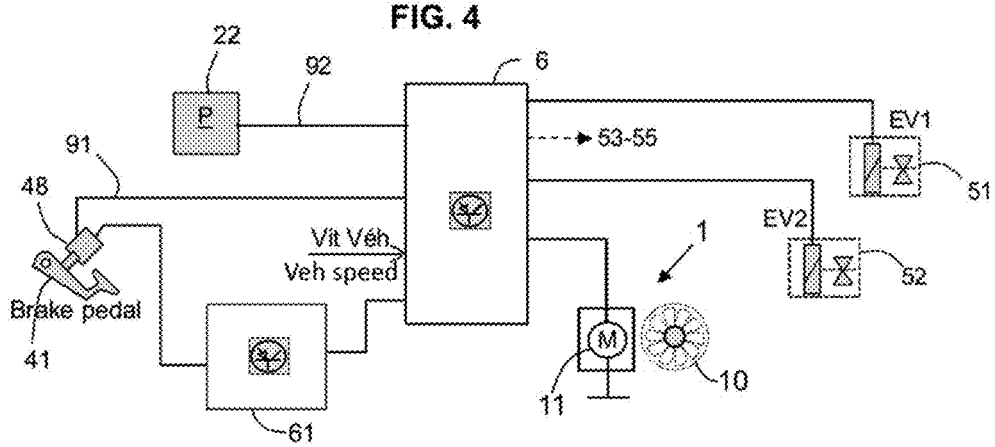
FIG. 4 shows a functional block diagram of a system for suctioning braking particles.

As can be seen in FIG. 4, a control unit 6 is provided that is in charge of controlling the solenoid valves described above. According to one possibility, this control unit 6 is also in charge of controlling the electric motor 11 which drives the turbine when the negative-pressure source is formed by a turbine. The commands may be implemented in a typical manner by power transistors, without a relay solution being excluded, however.

The control unit 6 receives information from sensor(s) and/or other units present on board the vehicle, in order to determine that a suction sequence must be activated, and to determine the time(s) when the activation must begin as well as the time(s) when the activation must stop.

The system further comprises a brake pedal 41 intended to be actuated by a driver of the vehicle. In some configurations, there is simply a binary on/off switch 48 in interaction with the brake pedal 41. This switch may deliver information 91 directly to the control unit 6 of the suction system. In another embodiment, the switch 48 is connected to a control unit 61 for the braking function, for example the unit which manages the ABS function, and which will transmit one or more items of information to the suction control unit 6 (via a wired connection or a multiplexed bus).

The control unit 6 can receive information originating from the pressure sensor 22, via the link denoted 92. This pressure sensor makes it possible to know the pressure P3 prevailing in the first pneumatic conduit, which allows making a diagnosis of proper operation of the first and second solenoid valves. In fact, if one of the solenoid valves fails, then the resulting pressure in the first conduit will be different from the pressure expected at nominal conditions.

In other configurations, the control unit 6 may receive information, originating from other elements present on board the vehicle, in particular from the braking actuator which controls the friction braking mentioned above. The braking actuator may be a pedal or a manipulator, depending on the type of stock or vehicles concerned (automobile, rail, etc.).

The control unit 6 also uses the current vehicle speed information VV. This may be delivered by a specific sensor or may be made available by one or more onboard computers.

The invention is also suitable for application in stationary rotor machines such as wind turbines or industrial machines. In this case, the timing information about activation of the friction braking is received by the control unit 6 of the suction system.

Figure 5:
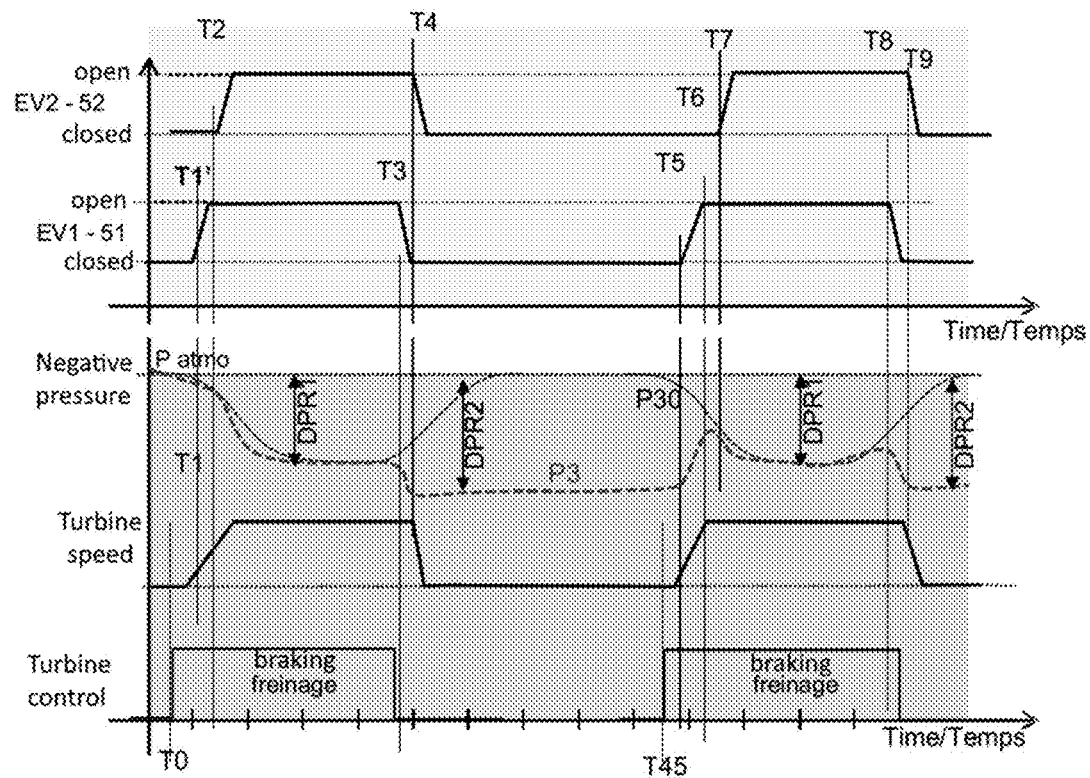
FIG. 5 shows timing diagrams illustrating at least one functionality of the system, FIG. 6 provides a physical illustration of the components of the system for suctioning braking particles.

With the aid of a timing diagram, FIG. 5 illustrates an example of the operating logic and associated control method.

At time T0, the conditions for activating a friction braking phase are met (for example, the driver presses on the brake pedal or pulls the manipulator, or a control system decides). The control unit 6 then activates the controlling of the turbine 11 at time T1 and triggers (simultaneously or in a slightly delayed manner) the opening of the first solenoid valve 51 at time T1' (or leaves it open if it was already open) and activates the controlling of the turbine 11.

Simultaneously or immediately thereafter, at time T2, the control unit 6 then triggers the opening of the second solenoid valve 52 (or leaves it open if it was already open).

From this moment, we are in an active suction phase in which the negative-pressure source, here the turbine, creates a negative pressure in the pneumatic circuit so as to suction the particles emitted from abrasion of the linings. In this phase, one will observe that the pressure prevailing in the first conduit 3 and the suction mouth denoted P3 has decreased (negative pressure DPR1, the curve deviating downwards from atmospheric pressure).

At time T3, the conditions for deactivating the friction braking phase are met, the control unit 6 closes the first solenoid valve 51 and stops the excitation of the turbine, simultaneously or in a slightly delayed manner. As the speed of the turbine drops to zero, the negative pressure in the pneumatic conduit tends to increase as can be seen in the curve denoted P3 showing negative pressure over time. A short time after T3, at time T4, the control unit 6 closes the second solenoid valve 52.

The pressure then prevailing in the first conduit 3 has further decreased (negative pressure DPR2 more pronounced than DPR1, the curve even further distanced downwards from atmospheric pressure).

From this moment, and throughout the time interval between two braking sequences, the pneumatic circuit interposed between the first solenoid valve and the second solenoid valve remains isolated. Because of this isolation, it retains the negative pressure which was prevailing when the second solenoid valve 52 was closed.

Thus, closing the first and second solenoid valves enables isolation of at least a portion of the pneumatic circuit.

At time T5, the conditions for activating a friction braking phase are again met. The control unit 6 then triggers the opening of the first solenoid valve 51 and activates the controlling of the turbine 11. Here, the negative pressure which has been maintained in the pneumatic conduit is used to suction the braking particles during the increase in speed of the turbine.

A short time after T5, at time T7, the control unit 6 opens the second solenoid valve 52. From this moment on, we have the conventional suctioning pneumatic circuit of the suction phase as already described above.

Time T6 corresponds to the establishment of the target speed of rotation for the turbine.

Time T8 corresponds to the discontinuation of the controlling of the turbine.

The curve denoted P3 represents the pressure prevailing inside the first conduit 3 (in other words substantially the suction pressure applied at the suction mouth 83 when the first solenoid valve 51 is open). The pressure applied at the suction mouth 83 in the absence of the arrangements provided for by the invention has also been represented, with smaller dotted lines P30.

According to one possible option, provision may be made for the sequence of stopping the turbine and closing the solenoid valves to be deferred relative to the actual discontinuation of the friction braking (extension time).

For staggering the timing between the controlling of the solenoid valves and the controlling of the turbine, one can choose the following offsets:
   T0-T1 offset: between 0 ms and 300 ms
   T1-T1' offset: between 0 ms and 300 ms
   T1'-T2 offset: between 10 ms and 300 ms
   T3-T4 offset: between 10 ms and 300 ms To illustrate the orders of magnitude, the power consumed by the turbine 10 and its electric motor 11 can range from around thirty watts to more than one kilowatt; in practice, this power may be comprised within a range of [30 W-800 W] depending on the number of suction mouths to be served and also depending on the length of the piping, which generates a slight pressure drop.

In one configuration, the speed of the turbine can range from 0 to 12,000 rpm.

In one configuration, the speed of the turbine can range from 0 to 30,000 rpm.

The response time of the turbine in order to go from zero to the setpoint speed can typically be between 100 ms and 700 ms, most often between 400 ms and 600 ms for automotive applications.

The invention claimed is:

1. A system for suctioning braking particles from a friction braking system, the suction system comprising:
   at least one negative-pressure source (1), at least one suction mouth (83), at least one pneumatic circuit (3,3',30) connecting the suction mouth and the at least one negative-pressure source, and a control unit (6),
   wherein the suction system further comprises closure means arranged on the pneumatic circuit, the closure means being able to isolate at least a first portion of the pneumatic circuit (3), the control unit (6) being configured to control the closure means according to a predetermined logic in order to isolate the first portion of the pneumatic circuit during certain phases between two actual uses of the at least one negative-pressure source, the predetermined logic being such that inside the at least one pneumatic circuit a negative pressure is maintained during deactivation of the at least one negative-pressure source (1).

2. The system according to claim 1, further comprising at least one filter (2) to collect the suctioned particles.

3. The system according to claim 1, wherein the closure means (51,52) comprise at least one first valve (51) arranged in the vicinity of the suction mouth and at least one second valve (52) arranged in the vicinity of the at least one negative-pressure source (1).

4. The system according to claim 2, wherein several suction mouths are provided for the at least one filter, the system further comprising additional valves (53-55), such that a valve is provided in the vicinity of each suction mouth.

5. The system according to claim 3, wherein said at least one first valve (51) and said at least one second valve (52) are solenoid valves.

6. The system according to claim 5, further comprising at least one filter (2) to collect the suctioned particles, wherein several suction mouths are provided for the at least one filter, the system further comprising additional solenoid valves (53-55), such that a valve is provided in the vicinity of each suction mouth, wherein the control unit (6) is configured to control individually each of the first and second solenoid valves, and to control individually the additional solenoid valves.

7. The system according to claim 1, wherein the at least one negative-pressure source is formed by a turbine (10) driven by an electric motor (11).

8. The system according to claim 1, wherein the control unit (6) is further configured to control the at least one negative-pressure source selectively, in a manner coordinated with the controlling of the closure means.

9. The system according to claim 2, wherein the closure means (51,52) comprise at least a first valve (51) arranged in the vicinity of the suction mouth and at least a second valve (52) arranged in the vicinity of the at least one negative-pressure source (1).

10. The system of claim 4, wherein the additional valves are additional solenoid valves (53-55).

11. The system according to claim 2, wherein the at least one negative-pressure source is formed by a turbine (10) driven by an electric motor (11).

12. The system according to claim 3, wherein the at least one negative-pressure source is formed by a turbine (10) driven by an electric motor (11).

13. A method for controlling a system for suctioning friction braking particles from a braking system of a vehicle, the suction system comprising:
   at least one negative-pressure source, at least one suction mouth (83), at least one pneumatic circuit (3,3',30) connecting the suction mouth and the at least one negative-pressure source, closure means arranged on the pneumatic circuit in order to isolate selectively at least a first portion of the pneumatic circuit (3) with a first valve (51) arranged in the vicinity of the suction mouth and a second valve, and a control unit (6) configured to implement the steps of:
   closing the first valve (51)
   closing the second valve (52),
   so as to isolate the first portion of the pneumatic circuit until the next actual use of the at least one negative-pressure source,
   stopping the activation of the at least one negative-pressure source,
   waiting for a new occurrence of the need to activate the at least one negative-pressure source,
   activating the at least one negative-pressure source,
   opening the first valve (51)
   opening the second valve (52).

14. The method according to claim 13, wherein the opening of the first valve precedes the opening of the second valve, in other words steps opening the first valve and opening the second valve are carried out in chronological order, during activation of the at least one negative-pressure source.

15. The method according to claim 13, wherein said first valve (51) and said second valve (52) are solenoid valves and their opening and closing is controlled by the control unit (6).

16. The method according to claim 13, wherein the closing of the first valve precedes the closing of the second valve, in other words steps closing the first valve and closing the second valve are carried out in chronological order, before or during deactivation of the at least one negative-pressure source.

17. The method according to claim 13, wherein said first valve (51) and said second valve (52) are solenoid valves and their opening and closing is controlled by the control unit (6), with individual control so as to be able to carry out steps opening the first valve and opening the second valve with a timing staggered according to the chronological order established in claim 13.

\* \* \* \* \*